INVENTORS
SHIH-YING LEE
YAO TZU LI

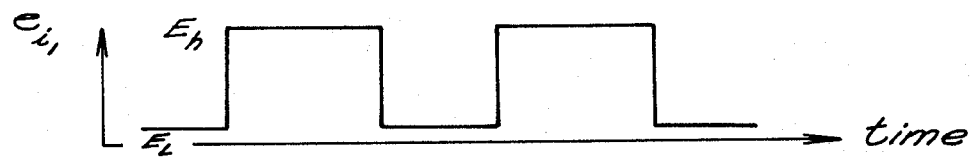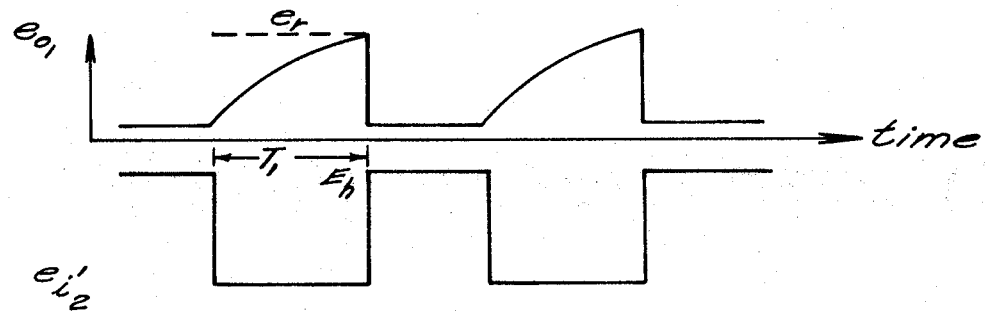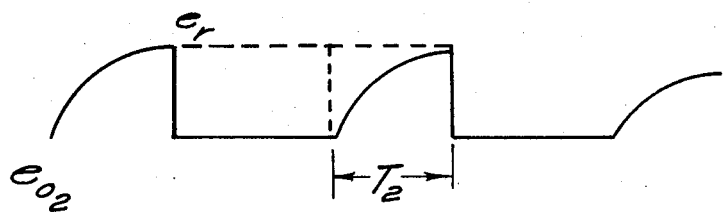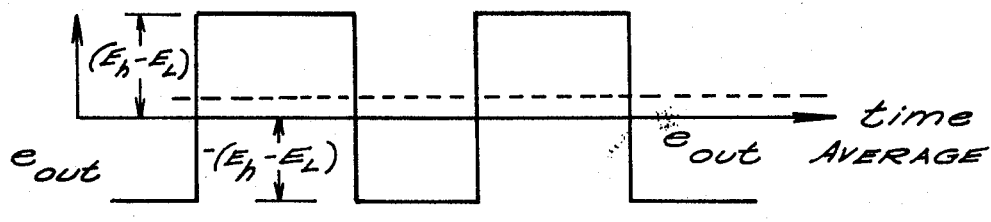
Fig. 2

INVENTORS
SHIH-YING LEE
YAO TZU LI
BY
Kenway, Jenney & Hildreth
ATTORNEYS

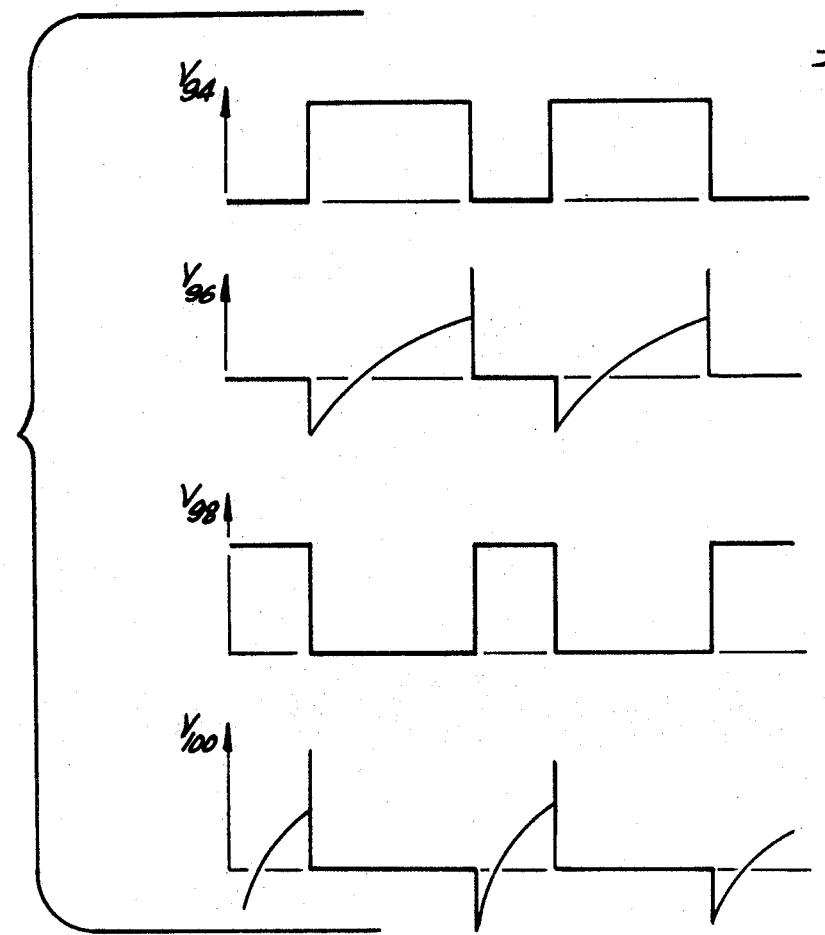
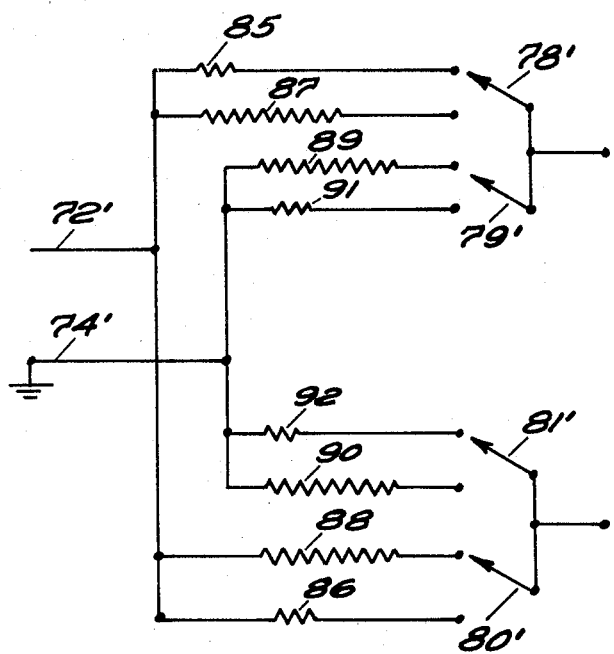

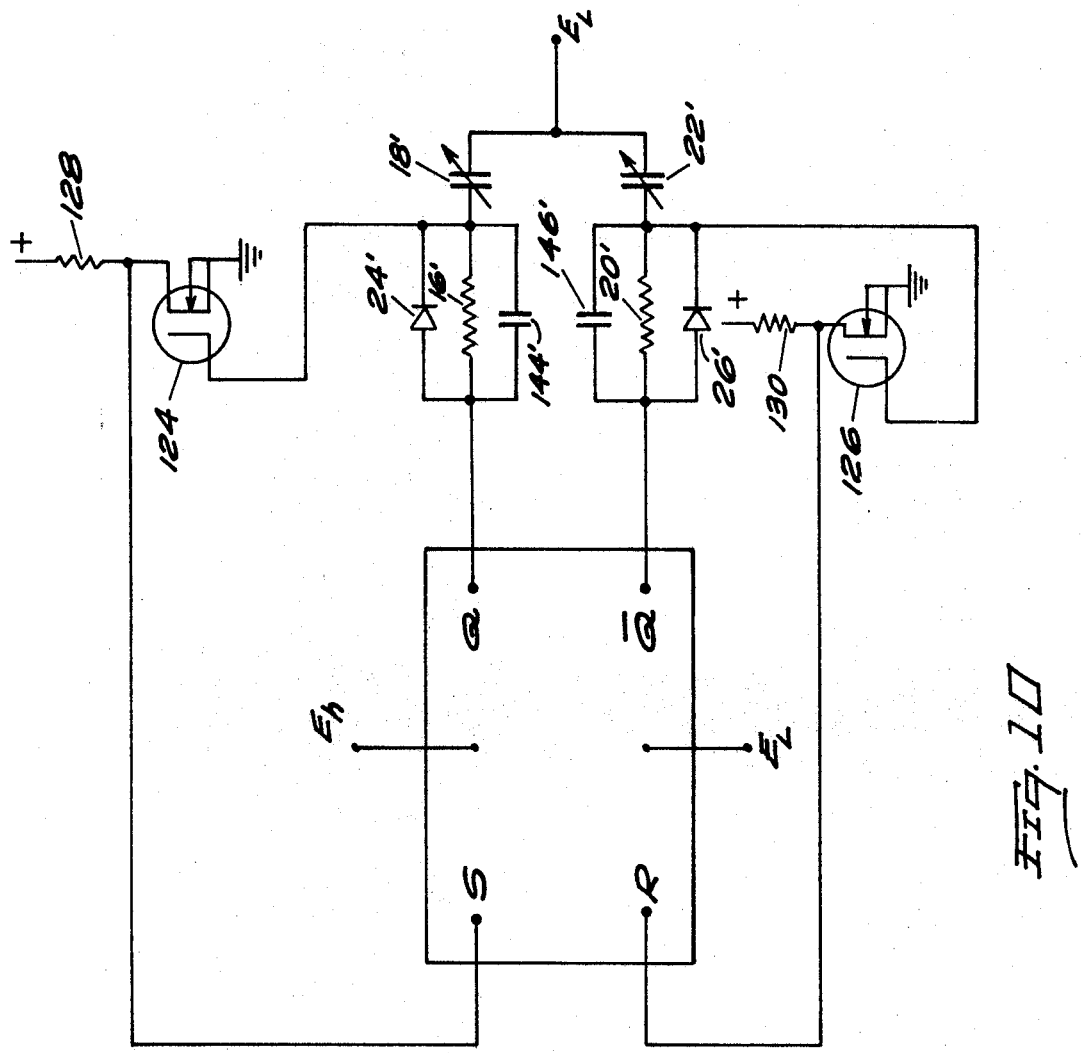
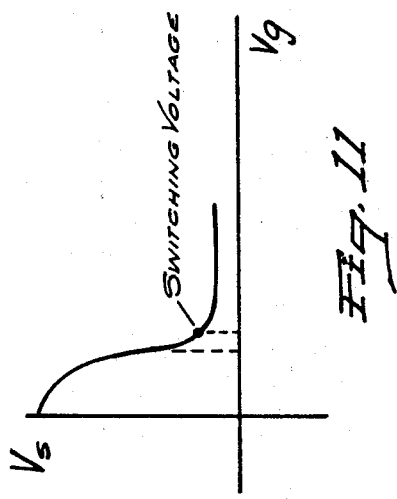

United States Patent Office 3,518,536
Patented June 30, 1970

3,518,536
MECHANO-ELECTRICAL TRANSDUCTION SYSTEM HAVING A PAIR OF ELECTRICAL SENSING NETWORKS ARRANGED TO BE TRIGGERED ALTERNATIVELY
Shih-Ying Lee and Yao T. Li, both of Huckleberry Hill, South Lincoln, Mass. 01773
Filed Nov. 8, 1967, Ser. No. 681,371
Int. Cl. H03k 3/26, 3/281; G01r 27/00
U.S. Cl. 324—57                                17 Claims

ABSTRACT OF THE DISCLOSURE

Mechano-electrical transduction through the use of sensing passive electrical parameters to control the response times of two networks, which in turn control the pulse duration of two pulse trains, the difference in the average values of the two pulse trains providing the output information.

---

Existing mechano-electric transducers normally operate on the principle of deriving output signal in accordance with the variation in the values of a set of sensing passive electric elements such as resistance, capacitance and inductance. In a conventional configuration, a set of four of these sensing elements is arranged in the form of a bridge excited by a regulated A.C. source with fixed amplitude, frequency and wave form. Because the output signal thus produced depends upon the impedance of the impedance elements, which is a function of the frequency, the system accuracy is closely related to the stability of the excitation source, that is the amplitude, the frequency, the wave form and the source impedance.

Furthermore, since the output signal is, in general a modulated signal produced by modulation of the excitation source by the transducer input signal, a demodulation involving phase sensitive rectification and filtering is needed to recover the input signal, except for a variable resistance bridge. While systems permitting the elimination of a separate phase sensitive rectifying have been devised, the need for a precision A.C. excitation source remains. U.S. Pat. No. 3,012,192 describes one such circuit involving the hybriding of one-half a capacitive bridge with one-half of a phase sensitive diode bridge. In essence this hybrid system allows the elimination of a separate phase sensitive rectifying system, but the need for a precision A.C. excitation source remains, and the output signal can be only a small fraction of the excitation voltage.

In our present invention, a novel approach to signal transduction is employed. Instead of relying on the frequency response of the sensing impedance element, which governs the performance of most bridge-type circuits, we use the transient response to step function excitation. Through the use of switching techniques, response times of a network of which the sensing impedance elements are a part are used to trigger the application of the step function on and off to yield a pulse width modulated output which can be recovered with simple filters. Thus in our present invention, the regulated A.C. excitation is replaced by regulated D.C. excitation, which is more readily available in many industrial and military applications and which has only one parameter to consider.

In a particular configuration of the present invention, a pair of sensing impedance elements is used to form, respectively, a pair of identical electrical networks. A D.C. excitation source is provided, and each of the pairs of sensing electrical networks is arranged to trigger alternatively the application of the excitation to the other network whenever the output response of the first network reaches a predetermined value. The circuits are also arranged to bring the output of the first network to its initial condition while the second is excited and vice versa. As a result of the criss-cross triggering, the inputs to the pair of sensing networks appears as two square wave pulses, with the pulse width and the spacing between the pulses proportional, respectively, to the response time of the two networks. One convenient way of providing an output is to utilize the difference of the average of the two pulse trains as the output signal, a step which requires some filtering but no rectification.

While in principle the sensor network may assume any convenient network form, for transducer application the most readily applicable circuits are of the form with first order dynamic lag such as the R–C, L–R circuit with a first order time constant as the dominating characteristic. Thus response time of this first order delay is proportional to the variation of either of the sensing electric parameters R, C or L in the circuit. These first order circuits yield linear output-input relationships as will be more fully described hereinafter. However, in some special applications a higher order or nonlinear circuit may be desirable to give specific nonlinear behavior or to introduce compensation effects in a nonideal situation.

Our invention may be more fully understood in conjunction with the following description and drawings wherein:

FIG. 1 is a schematic circuit diagram of an embodiment of the present invention;

FIG. 2 contains waveform diagrams relating to the operation of the circuit of FIG. 1;

Figure 5:
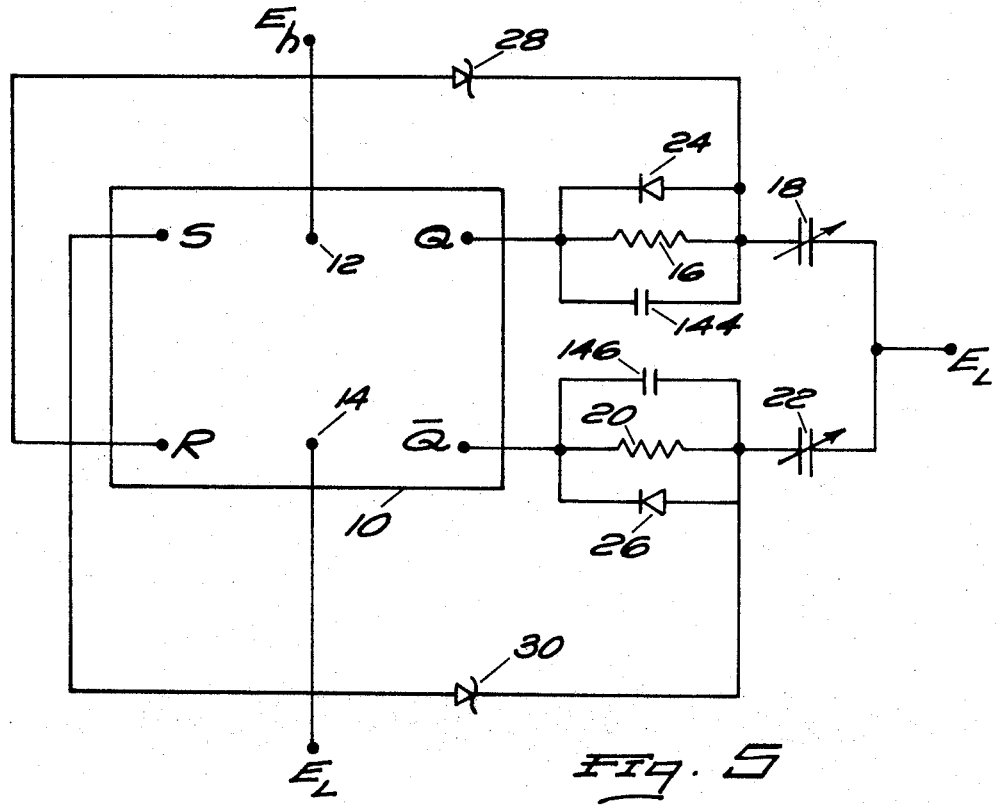
FIG. 5 is a schematic diagram of another embodiment of our invention utilizing a flip-flop as the switch means.
Figure 6:
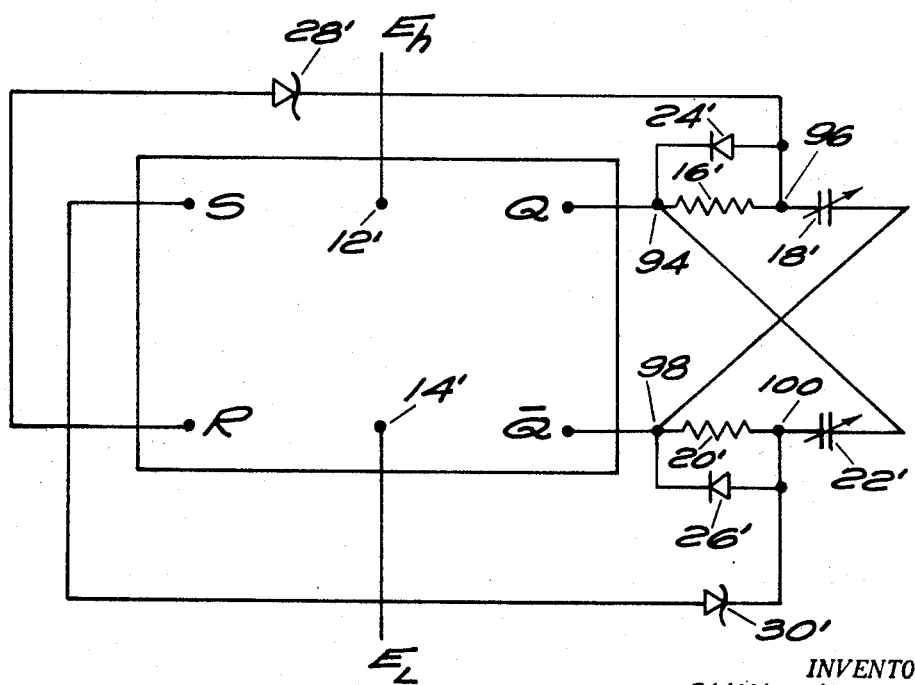
FIG. 6 is a schematic diagram of a modification of the embodiment of FIG. 5.
Figure 5:
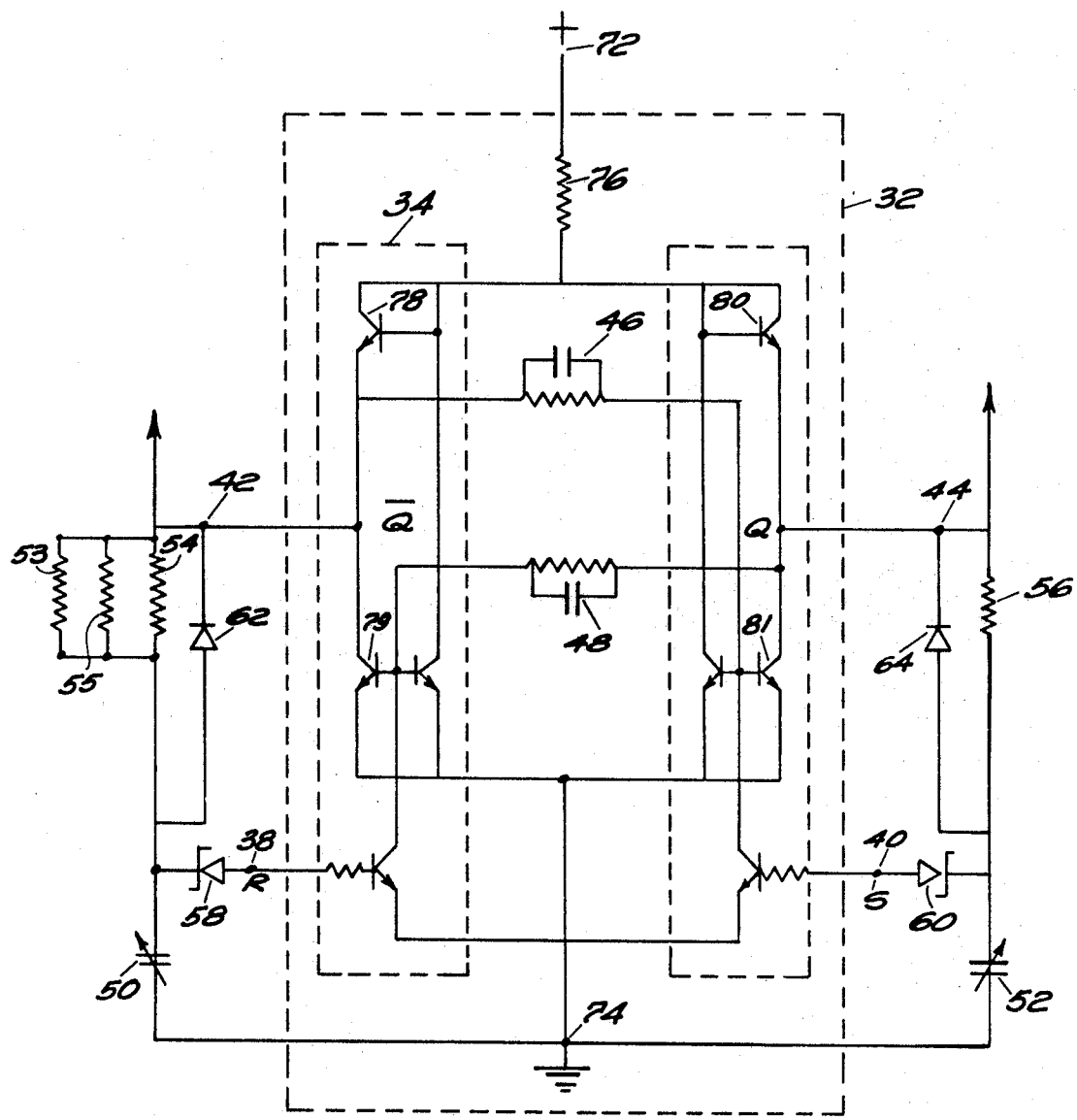
Figure 12:
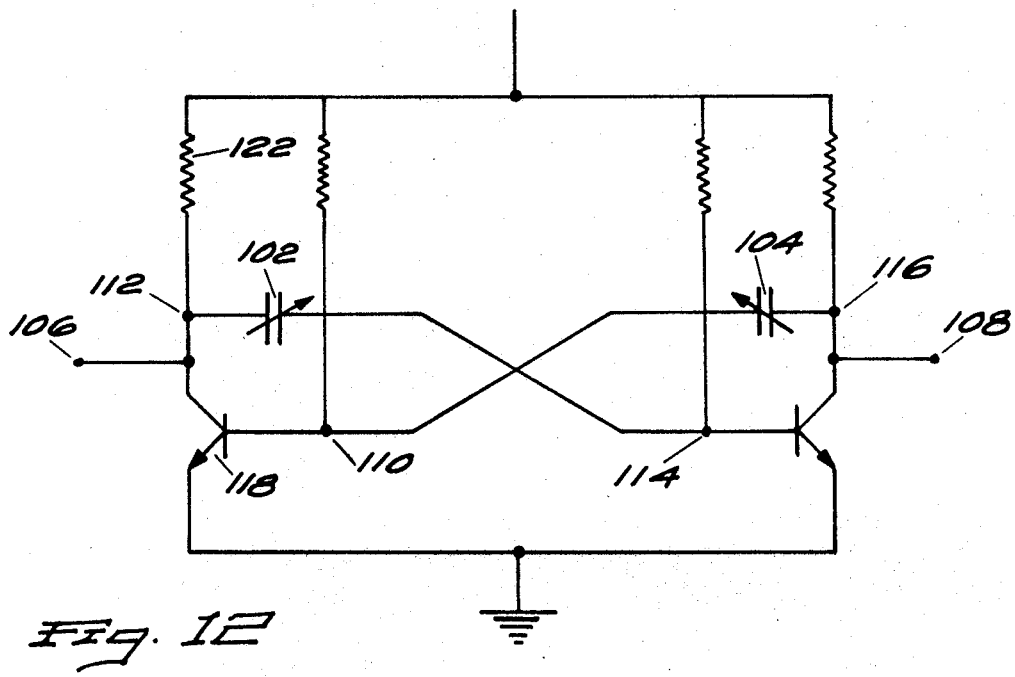

FIG. 7 contains wave forms relating to the operation of the circuit of FIG. 6;

FIG. 8 is a more detailed circuit schematic of another embodiment of our invention;

FIG. 9 contains a representation by switches and impedance of the flip-flop circuits of FIG. 10;

FIG. 10 is a schematic diagram of a modification of the circuit of FIG. 5 to ensure oscillation;

FIG. 11 contains a voltage transfer function relating to the operation of FIG. 10;

FIG. 12 is a simplified circuit version of our invention; and

Figure 13:
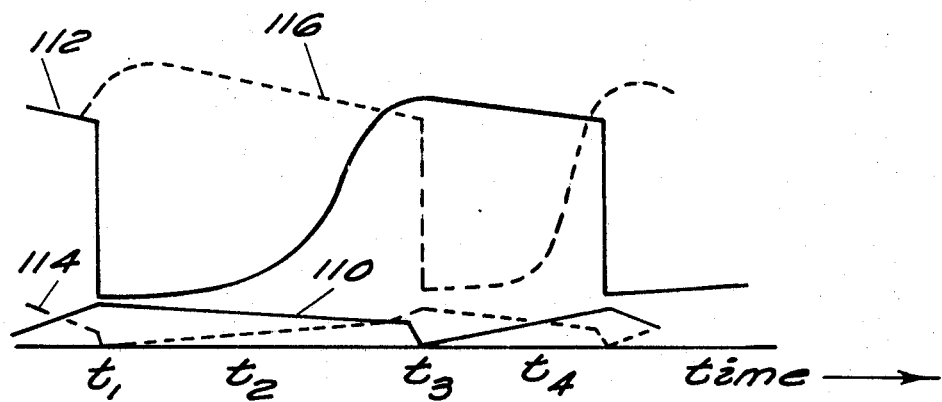

FIG. 13 contains wave forms relating to the operation of the circuit of FIG. 12.

Figure 1:
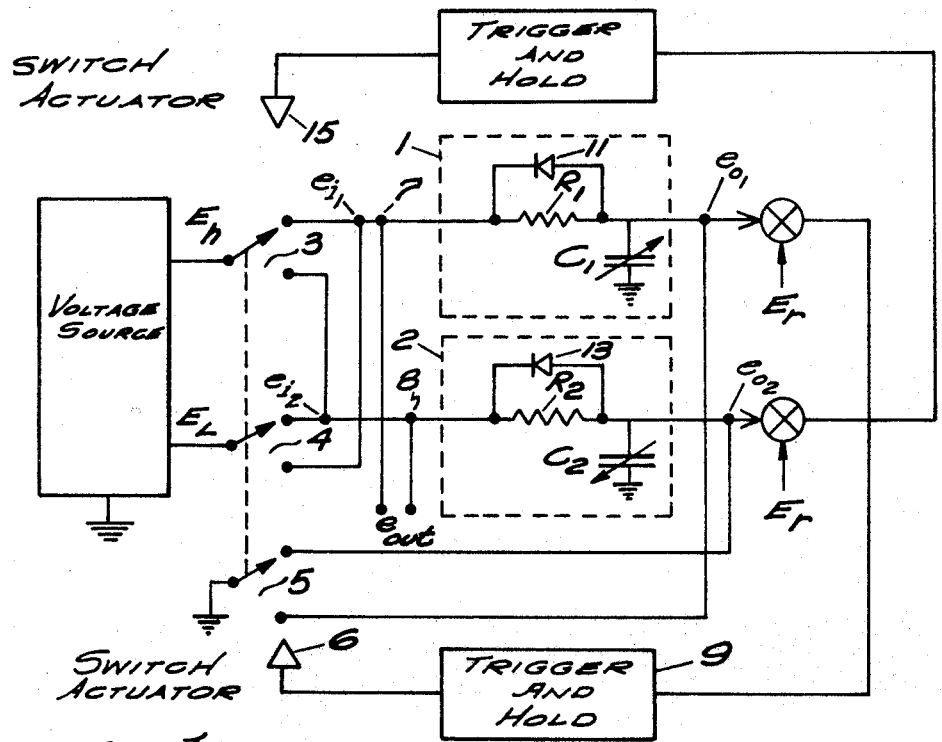

The operating principle of our invention may be illustrated by the schematic diagram of FIG. 1. Starting from the left end of the diagram a high voltage source $E_h$ and a low voltage source $E_L$ are shown. These sources can be coupled alternatively to a pair of sensing networks 1 and 2 through a set of double throw switches 3 and 4. As depicted in the diagram of FIG. 1, the switches are shown in the upper position with switch No. 3 engaging the high voltage source to the sensor network 1, switch 4 engaging the low voltage source to the input of sensor network 2, and switch 5 clamping the output end of the sensor network 2 to the low voltage source. As those skilled in the art of analog computer design will know, one should employ as many clamping switches as there are energy storages in the circuit to ensure identical initial conditions, even though in certain designs clamping switches may be replaced by diodes. (In FIG. 1 diodes 11 and 13 could be used to replace clamping switch 5.)

In the portion of the operating cycle illustrated in FIG. 1, the sensor network 1 is excited by the high voltage source. Network 1 has started from an initial condition of the specified low voltage which was ensured by the preceding cycle, with an action corresponding to the clamping state now prevailing in network 2. For a first order R-C impedance as illustrated, the response of the output of the circuit is an exponential function of time, such as:

$$e_{o1} = (E_h - E_L) \epsilon EXP(-t_1/RC_1)$$
$$= \Delta e \epsilon EXP(-t_1/RC_1) \quad (1)$$

where $e_{o1}$ = volt of output of first sensor circuit
$E_h$ = high voltage level
$E_L$ = low voltage level
$\epsilon EXP$ = natural base exponential
$t$ = time
$R$ = resistance of impedance circuit networks
$C$ = capacitance of impedance of circuit network and subscript 1 or 2 specifies the channel.

As shown at the right-hand end of the circuit of FIG. 1, the output voltage of network 1 is compared with a predetermined reference voltage $E_r$ and a trigger-and-hold circuit 9 is used to follow this output voltage comparator to energize the lower switch actuator 6 which in turn reverses the switches 3, 4 and 5 and thereby initiates the next cycle.

The time sequence of the switches and the voltages of the circuit of FIG. 1 for two complete cycles are shown in FIG. 2.

The output of the system as shown in FIG. 1 is taken across the input terminals 7 and 8 of the two impedance networks. Effectively this means that the system output $e_{out}$ is equal to the difference of $e_{i1}$ and $e_{i2}$, the voltages at the input terminals 7 and 8. Thus $$e_{out} = e_{i1} - e_{i2} \quad (2)$$

$e_{out}$ is as shown in the bottom of FIG. 2. Ideally the average of $$\bar{e}_{out} = \Delta e \frac{T_1 - T_2}{T_1 + T_2} \quad (3)$$

where $T_1$ = time for first circuit to reach reference voltage
$T_2$ = time for second circuit to reach reference voltage, and
$\Delta e$ = the difference between $E_h$ and $E_L$.

In practice, when conventional filters are used, this average D.C. output has superimposed upon it the ripples resulting from the filtering of the harmonic content of the square wave. For practical purposes, however, this ideal D.C. output $\bar{e}_{out}$ is of primary interest to the transducer user.

In the circuit of FIG. 1, $T_1$ and $T_2$ are determined by the response time of the two networks to reach the reference voltage. Thus for first order systems, we have by solving for $t$ in Equation 1 when $e_{o1} = e_r$:

$$T_1 = R_1 C_1 \log \frac{E_h - E_L}{e_r - E_L}$$
$$= C_1 K \quad (4)$$

Similarly, $$T_2 = C_2 K$$

where $K = R \log \frac{E_h - E_L}{e_r - E_L} = $ constant $$(R_1 = R_2 \text{ in Fig. 1}) \quad (5)$$

Substituting (5) into (3) we have $$\bar{e}_{out} = \Delta e \frac{C_1 - C_2}{C_1 + C_2} \quad (6)$$

Figure 3:
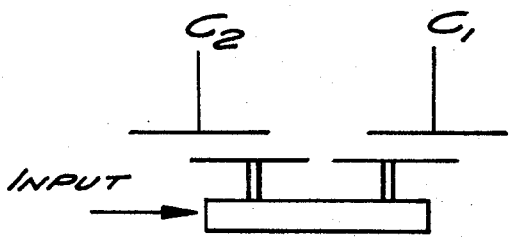
FIG. 3 illustrates a pair of capacitances actuated by linear mechanical motion and suitable for use in the circuit of FIG. 1.

In conventional transducer designs, $C_1$ and $C_2$ are usually arranged in a push-pull manner so that while $C_1$ is increasing when the transducer is being subjected to an input signal, $C_2$ is decreasing correspondingly. Moreover, in responding to the transducer input signal, $C_1$ and $C_2$ may vary either in direct proportion or to the reciprocal of the transducer input. A typical example for the former case may be found when a sliding-gate type capacitance is involved. In this case the input of the transducer would effect a mechanical displacement of the push-pull pair by increasing the overlapping area of one while decreasing that of the other as shown in FIG. 3. Assuming the capacitance is in direct proportion to the overlapping area, and therefore, the displacement, we have $$C_1 = C_0 + x k_2$$
$$C_2 = C_0 - x k_2 \quad (7)$$

where $C_0$ = normal capacitance
$x$ = mechanical displacement
$k_2$ = sensitivity constant Substituting (7) into (6) we have $$\bar{e}_{out} = \Delta e \frac{x k_2}{C_0} \quad (8)$$

which show that $\bar{e}_{out}$ is a linear function of the mechanical displacement input $x$. This would make the overall system sensitivity linear if the transducer input of any physical parameter is in direct proportion to the mechanical input $x$. Or in a more general sense a linear performance can be achieved when the impedance variation is in direct proportion to the transducer input.

Figure 4:
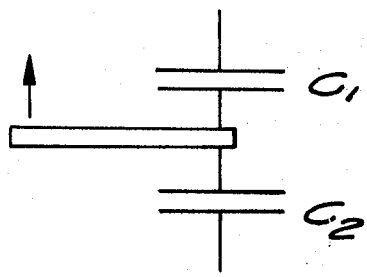
FIG. 4 illustrates a pair of capacitances arranged so that linear mechanical motion produces a reciprocal variation in capacitance.

In the second type of impedance variation the impedance is a reciprocal function of the transducer input. A typical example may be found in the case of gap variation type capacitance as shown in FIG. 4. In this type of mechanical configuration $$C_1 = \frac{C_0}{1-r} \quad (9)$$
$$C_2 = \frac{C_0}{1+r}$$

where $C_0$ is the capacitance of each side when the plate is centered and the term $r$ is defined such that $$r = x/x_0 \text{ with } x_0 = \text{normal gap}$$

Substituting (9) into (6) we have $$\bar{e}_{out} = \Delta e r$$
$$= \Delta e \frac{x}{x_0} \quad (10)$$

Again, a linear performance is achieved for the gap-type capacitance as illustrated in Equation 10. This linear property would apply equally well for a gap varying type of variable inductance sensor when it is used in a similar configuration.

While variable reactances have been used in the above discussion of transducer operation, variable resistors can also be used. The analysis is then similar to that set forth above. For example, Equation 4 becomes:

$$T_1 = R_1 K \quad (4)'$$

and Equation 5 becomes $$T_2 = R_2 K \quad (5)'$$

While the schematic diagram of FIG. 1 illustrates the basic operating principle of our invention, various simplified configurations are available to give the desired performance. The first simplification involves the replacement of clamping switch 5 of FIG. 1 with a pair of diodes 11 and 13 across $e_{i1} - e_{o1}$ and $e_{i2} - e_{o2}$, respectively, as shown in FIG. 1. Although both the clamping switch 5 and diodes 11 and 13 are shown in FIG. 1, only the clamping switch or the diodes would be used. The polarity of the diodes as shown would assume an "open circuit" condition when the sensor impedance circuit is excited by $e_{11}$ or $e_{12}$ respectively and "short circuit" condition when $e_{11}$ and $e_{12}$ are connected to the low voltage source. If other circuit conditions called for clamping the "charge" rather than "discharge" portion of the circuits, the diode polarity would be reversed.

FIG. 5 shows a schematic circuit utilizing a flip-flop unit as the switching means. The flip-flop 10 has two excitation terminals 12 and 14 which are connected to the high and low voltage excitation sources, respectively. The flip-flop has two output terminals Q and $\overline{Q}$ which are internally switchable to voltages substantially equal to the high and low excitation voltages. The output of the circuit is provided across terminals Q and $\overline{Q}$. These terminals also provide the input to the two sensing networks. The first network, connected to output Q, consists of resistor 16 and sensing capacitor 18. The second network, connected to output $\overline{Q}$, consists of resistor 20 and sensing capacitor 22. Diodes 24 and 26 are paralleled with resistors 16 and 20 to reduce the discharge times. The common terminal of capacitors 18 and 22 is connected to the lower excitation voltage $E_L$. Zener diodes 28 and 30 in the feedback paths ensure a precise switching point.

The flip-flop is so constructed that the two output terminals Q and $\overline{Q}$ must have different voltage levels if only one input S or R is energized. The two input terminals S and R are often referred to as the set and rest input terminals. The relationship between the two input terminals and the two output terminals can be summarized by the truth table set forth below as Table I.

TABLE I

| S | R | Q | $\overline{Q}$ |
|---|---|---|---|
| 1 | 0 | 1 | 0 |
| 0 | 0 | 1 | 0 |
| 0 | 1 | 0 | 1 |
| 0 | 0 | 0 | 1 |
| 1 | 1 | 1 | 1 |

Those skilled in the electronic arts involving flip-flops will recognize that the symbol 1 in the truth table signifies a high voltage condition, and the symbol 0 signifies a low voltage condition.

The flip-flop switching means has another property which is useful for our invention, that is, its bistability or toggle action. When the signal at S or R reaches a certain predetermined value, the output Q and $\overline{Q}$ will change state in conformance with the truth table very quickly. There is no change whatever before this signal level is reached. The wave forms involved in the operation of the circuit of FIG. 5 are substantially the same as those shown in FIG. 2 for embodiment of FIG. 1.

It may be noted that in the circuit of FIG. 5 the two sensing capacitances have a common lead. Another arrangement of the sensing networks is shown in FIG. 6. With this arrangement, the sensing networks are connected in a criss-cross fashion between the two output terminals and there is no common lead for the two capacitances. The wave forms are quite different in this case and are shown in FIG. 7. It will be noted that there is an initial overshoot in the voltage at the capacitor so that in effect the voltage at the capacitor is doubled. Therefore, while it may be inconvenient not to have the common lead, the circuit is particularly desirable for conditions in which low value capacitors must be used.

FIG. 8 illustrates a complete circuit diagram of a typical flip-flop unit together with the sensing circuits and triggering means. The basic flip-flop circuit is shown in the dotted line block 32 of FIG. 8. Flip-flop circuits are well known in the electronic arts, and a detailed description of the operation of this circuit is omitted here. It should be noted, however, that this symmetrical circuit consists of a pair of regenerative amplifier segments 34 and 36 so that as soon as the control voltage 38 and 40 of respective segments reaches a certain level, the output 42 and 44 of the respective segment will plunge instantly to a low level. Internal coupling networks 46 and 48 are used to perform cross-triggering so that when output 42 plunges down, its effect is to propagate to section 36 through network 46 and thereby bring output 44 up.

A flip-flop circuit has the inherent properties of remaining stable while having either side at a high or low voltage level until the control voltages, in this circuit at 38 or 40, is subjected to a change. In the present arrangement this change is effected by charging the sensor capacitances 50 and 52 through the resistances 54 and 56, spectively. A pair of Zener diodes 58 and 60, may also be used between input 38 and 40 of the flip-flop circuit and the sensor capacitances, 50 and 52, to provide the proper voltage bias and sharp triggering action resulting from the nonlinear resistance property of the Zener diode. The diodes 62 and 64 are used to provide the clamping of the circuit to the low voltage level as discussed before in conjunction with FIG. 1. The output of this system is taken across terminals 42 and 44.

The operation of this circuit may be described progressively starting with the assumption that output 42 is at the beginning of a high voltage phase and output 44 is at a low voltage phase. Sensor capacitance 50 will be charged through resistance 54 and thus raise the voltage at points 66 and 38. As soon as the voltage at the control terminal 38 reaches the triggering level of the circuit, the output voltage 42 of section 1 immediately plunges downward to a low voltage level. This sudden drop in voltage easily propagates through the capacitance of circuit 46, produces a stronger effect than the voltage at control point 40 and thereby brings the voltage at output terminal 44 of secion 36 to the high voltage level, and thereby starts the charging cycle of sensing condenser 52. This sudden rise of voltage at terminal 44 propagating through circuit 48 further strengthens the recently raised voltage at terminal 38 to help hold the voltage at terminal 42 at the low level. The charging up of capacitance 52 then repeats a sequence similar to that just described.

In the circuit of FIG. 8 the high and low voltage level experienced by the flip-flop output terminals 42 and 44 are generated by the circuit parameters and are not the same as the plus voltage at 72 and the ground voltage at 74. However, in practice the high voltage level at 42 and 44 is practically equal to the plus voltage at 72. This is because in the conducting state the resistance across the supply terminal 72 and the output terminals 42 and 44 through the common resistance 76 and the corresponding transistors 78 and 70 are quite low in comparison to other load resistances.

The flip-flop circuit of FIG. 8 can also be characterized by the switches shown in FIG. 9 with the associated resistances 85 through 92. Switch 78' of FIG. 9 together with resistances 85 through 87 represents the two operation states of the transistor 78 of FIG. 8. Likewise, this is true for switches 80', 79', and 81' with respect to the correspondingly numbered transistors.

In the diagram of FIG. 9, the length of the resistance also symbolizes the size of the resistance: a short one represents a very low impedance while a long one means a very large value. Thus when all the switches are in the upper position as shown, the voltage at 42' would be nearly equal to the supply voltage at 72' while the voltage at 44 would be nearly equal to the ground voltage at 74'. The reverse situation would be true if the switches were in a down position. If all the high resistances approach open circuit, then the four double throw switches of FIG. 9 can be combined to two double throw switches as illustrated in FIG. 1.

The resistances 85 through 92 of FIG. 9 represent the characteristics of the transistor pairs. Their symmetry and stability are essential for precision transduction.

A modification of the arrangement of FIG. 5 is shown in FIG. 10. In this embodiment, a pair of field-effect transistors 124 and 126 have been added. Other similar electronic devices could be used. The principal other change in the circuit of that of FIG. 5 is the reversal of the polarity direction of diodes in parallel with the charging resistors in the two sensing networks and the reversal of the input leads to which the feedback from the outputs are connected. The field-effect transistors 124 and 126 together with their series resistors 128 and 130 serve as voltage inverters. That is when the input voltage to the gate of the transistor goes up, the output voltage of the transistor goes down. This voltage relationship is shown in FIG. 11. The operating point is chosen so that a very small variation in the gate voltage $V_g$ can cause a very large variation in output voltage $V_s$. Thus a very sharply defined switching voltage and operation is obtained. As noted above, with the inversion in the feedback path produced by the field-effect transistors 132 and 134 the polarity of the diodes 136 and 138 and the connection of the feedback leads to the input terminals S and R are both reversed.

An important advantage of the circuit of FIG. 10 over that of FIG. 5 is that it has no "stall" condition. If one examines FIG. 5 and the truth table of the flip-flop Table I, one can see that while most starting conditions result in an oscillatory condition with the wave forms similar to those shown in FIG. 2, it is possible for the initial conditions to be that shown by the last line of the truth table. That is both inputs and both outputs might by chance be in the ONE state when the circuit is energized. This condition is a "stall" condition since the ONE outputs results in ONE inputs which would produce ONE outputs. This stable condition could be disturbed, of course, by some external or internal disturbance which could purposefully be introduced. With the modification of FIG. 10, a "stall" condition can never exist. If both outputs are in the ONE state, the inversion in the feedback path produced by the field-effect transistors will produce ZERO inputs. If both inputs are ZERO, the ouputs will be in the ZERO, ONE state, and the circuit will be started in an oscillatory state. With the inversion, there is "stall" state.

While the feedback inversion of FIG. 10 has been shown as applied to the circuit of FIG. 5, it could equally well be applied to the circuit of FIG. 6. While the wave forms would be different, the prevention of a stall or stable condition would be achieved.

The schematic of FIG. 1 and the embodiment of FIG. 8 are illustrative of the present invention. Variations of these basic configurations may be realized either with additional sophistication to ensure better regulation of the various voltage levels pertinent to the accuracy of the system, or, on the other hand, by omitting some features in exchange for simplicity. One such scheme is shown in the embodiment of FIG. 12.

The circuit of FIG. 12 bears some resemblance to a simple multivibrators. However, the fixed capacitances of a multivibrator have been replaced with the variable sensor capacitances 102 and 104. The signal at output terminals 106 and 108 is utilized in push-pull manner and subjected to further filtering. In a multivibrator a pair of fixed capacitors of equal value are used to assure symmetry in wave form, and an output from one terminal is usually used to provide the oscillating signal. In the present invention the difference of the two outputs from terminals 106 and 108 are used so that when the sensor capacitances are equal and the wave forms are symmetrical, the D.C. level of the system output is ZERO, and when there is a difference in the sensor capacitance then there is a net D.C. output. While the circuit of FIG. 12 gives the appearance of simplicity in physical structure, it does include most of the essential functions discussed in connection with FIG. 1. However, each function is performed together with other function so that a detailed analysis is complicated and high performance criteria are difficult to achieve.

In a qualitative manner, the voltage cycle at the four critical points 110, 112, 114 and 116 of FIG. 12 is sketched in FIG. 13. Starting from $t_1$ transistor 118 is triggered to conduct by the approach of the voltage at 112 to the voltage at 110. A regenerative process sets in because as the transistor is made to be more conductive as the two voltages come closer, this process is inturn accentuated by the increasing conductivity of the transistor. As a result, voltage 112 takes a plunge, which also forces voltage 114 to take a stepwise drop. From this new low point, the voltage at 114 climbs up slowly and in turn brings the voltage at 116 down slowly from its high point, which in turn forces the voltage at 110 to drop. Now, however, even though the voltage at 112 and 110 are separated from each other, we cannot expect the occurrence of the fast regenerative pattern in reverse as discussed before, because of the capacitance load which must be charged up by resistance 122 while current is draining through the transistor 118.

Time $t_2$ marks the transition of transistor 118 from a closed circuit condition to an open circuit condition which allows voltage 112 to rise more closely to the exponential function corresponding to the characteristic of charging capacitance 102 through resistance 122.

At time $t_3$ the voltage at terminal 116 takes the plunge to repeat the cycle described previously for the voltage at 112.

Although the performance of the system as shown in FIG. 9 is difficult to analyze and high precision is difficult to achieve, its simplicity makes it useful for transducer designs where critical performance is not required.

For convenience, the above embodiments have been shown with R-C circuits, with capacitance as the primary sensing impedance element. Typical applications are a variable capacitance pressure cell or accelerometer or a temperature sensitive capacitance. If an arrangement such as the circuit of FIG. 8 is used with a 6-volt D.C. source and a pair of variable capacitors in the 50-MMF range, a several volt output can be produced with a linear range substantially wider than that attainable with prior art arrangements.

Since an A.C. input is not utilized in the embodiments of this invention, no frequency or waveform control is necessary. Moreover, almost the entire excitation voltage can be converted into output voltage signals. Since the output terminals are clamped by the switches to the excitation source, output load has very little effect on the output signal.

Referring again to FIG. 8, resistor 54 or 56 may be provided in adjustable rather than a fixed form. In that case, the null balance for zero signal can be achieved by varying the value of one of the resistors to balance out minor variations in the values of circuit components. A temperature induced problem of transducer equipments is that of changes in null balance produced by changes in temperature. By providing corresponding elements in the two passive networks, for example, resistors 54 and 56, with different thermal coefficients, the change in relative characteristics produced by this difference in thermal coefficient can be made to exactly compensate for changes in null balance otherwise produced by the thermally induced changes in circuit output. With typical components satisfactory compensation may be provided by selection from a relatively small group of transistors, selecting a combination to provide a null balance at two widely spaced points in the thermal range.

Furthermore, by using a group of resistors for one of the elements, for example, resistors 53, 54 and 55 rather than merely resistor 54, the resistors 53, 54 and 55 having predetermined different thermal coefficients, thermally induced changes in circuit sensitivity may be compensated for. Considering Equations 3, 5 and 6, for example, it will be seen that the change in sensitivity with temperature is a function of the change in charging resistance value with temperature. With selection of a group of three resistors to match sensitivity at separated points in the thermal range, excellent thermal sensitivity correction can be achieved. An extensive discussion of the factors involved in correcting for sensitivity changes is set forth in our Pat. No. 3,248,936 entitled "Temperature Compensated Transducer."

In some cases circuit for component characteristics may produce a nonlinear output. In such situations linearity may be improved by providing capacitors in parallel with the charging resistors if an RC network is used. In FIG. 5, for example, capacitors 140 and 142 would be added in parallel with resistors 16 and 20. These capacitors are otherwise unnecessary and would not be used unless additional linearity correction is needed.

Although our invention has been described with respect to certain specific embodiments, it will be apparent to those skilled in the transducer and electronic arts that other combinations and modifications of the features and elements disclosed may be made without departing from the scope of our invention.

Having thus described our invention, we claim:

1. A mechano-electrical transduction system utilizing variations in the values of passive electric elements to produce an electric signal comprising a source of D.C. excitation, said excitation source having first and second excitation terminals of different voltage levels, first and second output terminals, switching means for each of said output terminals, each of said switching means being adapted to connect its associated output terminal to said first or second excitation terminals, a sensing network connected to said output terminals and switching means, said sensing network containing at least one passive electric element whose value is changed by the quantity being sensed, said sensing network serving to control the operation of the switching means to change the relative times that said first and second output terminals are connected to said first and second excitation terminals, each of said output terminals being connected to an excitation terminal, whereby the electric signal between the output terminals is a function of the variation of the value of said passive element.

2. The transduction system of claim 1 wherein said first and second excitation terminals, said first and second output terminals and first and second switching input terminals for said switching means are provided by an electronic flip-flop circuit having two control terminals serving as the switching input terminals, two excitation terminals serving as the first and second excitation terminals, and two output terminals serving as the first and second output terminals and said first and second output terminals are connected to first and second passive electric networks, said first and second passive electric networks serving as the sensing network and being connected to the second and first switching input terminals respectively, a voltage or current value within each of said passive electric networks serving to actuate the associated control terminal.

3. A transduction system according to claim 2 wherein said first and second passive networks each have a first terminal connected to said first and second output terminals respectively and a second terminal connected through common means to one of said excitation source terminals.

4. A transduction system according to claim 2 wherein said first and second passive networks each have a first terminal connected to said first and second output terminals respectively and a second terminal connected to the first terminal of the other passive network.

5. A transduction system according to claim 2 wherein said passive electric networks comprise a pair of resistance-capacitance circuits, at least one impedance in said resistance-capacitance circuits serving as a mechano-electrical transducer and control means associated with each of said resistance-capacitance circuits, a predetermined voltage level within each of said resistance-capacitance circuits serving as the voltage value which actuates the associated control terminal, whereby the electric signal at the output terminals provides an output proportional to the input of said transducer.

6. The transduction system of claim 1 wherein said first and second excitation terminals, said first and second output terminals and first and second switching input terminals for said switching means are provided by an electronic flip-flop circuit having two control terminals serving as the switching input terminals, two excitation terminals serving as the first and second excitation terminals, and two output terminals serving as the first and second output terminals, first and second passive electric networks, each of said passive networks having a resistance and a capacitance, first and second unidirectional circuit elements connected in parallel with each of said resistances, respectively, a terminal of each unidirectional element connected to one of said output terminals, whereby the terminal associated with an energy storage element of each passive network is clamped to the voltage of the associated output terminal during the portion of the cycle that the other passive network is operative, the resistance and capacitance of each of said passive networks being connected in series, a terminal associated with an energy storage element of each of said networks being connected to a control terminal of said flip-flop, at least one capacitance of one of said passive networks serving as a sensing transducer, whereby the electric signal between said output terminals is a function of the variation in the value of said sensing transducer.

7. The transduction system of claim 1 wherein said first and second excitation terminals, said first and second output terminals and first and second switching input terminals for said switching means are provided by an electronic flip-flop circuit having two control terminals serving as the switching input terminals, two excitation terminals serving as the first and second excitation terminals, and two output terminals serving as the first and second output terminals, first and second passive electric networks, each of said networks having a resistance and a capacitance, a unidirectional circuit element connected in parallel with each of said resistances, the resistance and capacitance of each of said networks being connected in series, an inverter connected to the junction of the resistance and capacitance of each of said networks, each of said inverters being connected to a control terminal of said flip-flop, at least one capacitance of one of said passive networks serving as a sensing transducer, whereby the electric signal between said output terminals is a function of the variation in the value of said sensing transducer.

8. A transduction system according to claim 1 wherein said sensing network comprises a series resistance capacitance combination, the capacitance of the capacitor varying in accordance with the input being sensed.

9. A transduction system according to claim 1 wherein said sensing network comprises a series resistance inductance combination, the inductance of the inductor varying in accordance with the input being sensed.

10. A transduction system according to claim 8 wherein a unidirectional circuit element is connected in parallel across said resistor to reduce, in one direction, the response time of said network.

11. A transduction system according to claim 9 wherein a unidirectional circuit element is connected in parallel across said resistor to reduce, in one direction, the response time of said network.

12. A transduction system according to claim 1 wherein a Zener diode is employed to determine the switching voltage controlling the switching means for said output terminals.

13. A transduction system according to claim 1 wherein a circuit element having very steep input-output characteristics is employed to determine the switching voltage controlling the switching means for said output terminals.

14. A transduction system according to claim 1 wherein said system is provided with two passive networks and a passive electric element may be varied to provide a null balance by changing the charging characteristics of one network.

15. A transduction system according to claim 1 having at least two passive networks, at least one circuit element in each of said networks having a thermal resistance coefficient different from corresponding elements in the other passive network whereby changes in system null balance which would otherwise be produced by changes in temperature are eliminated by the cancelling effect of thermally produced changes in circuit parameters.

16. A transduction system according to claim 1 wherein said sensing network comprises a group of elements with predetermined thermal resistance coefficients whereby changes in circuit sensitivity which would otherwise be produced by changes in temperature are eliminated by the cancelling effect of thermally produced changes in circuit parameters.

17. A transduction system according to claim 1 wherein said sensing network comprises a series resistance capacitance combination, said combination having first and second capacitors, said first capacitor being connected in series with said resistance, the capacitance of said first capacitor varying in accordance with the input being sensed, said second capacitor being connected in parallel with said resistance, said second capacitor serving to increase the linearity of said transduction system.

References Cited

UNITED STATES PATENTS

| | | | |
|---|---|---|---|
| 2,182,555 | 12/1939 | Geiger | 331—144 |
| 3,226,979 | 1/1966 | De Boice | 324—61 X |
| 3,325,727 | 6/1967 | Haas | 324—60 |
| 3,375,716 | 4/1968 | Hersch | 324—61 |
| 3,421,108 | 1/1969 | Keller | 331—113 |

OTHER REFERENCES

Bell, E. C., and Robson, D.: "Use of Multivibrators in Small Telemetry Systems." In Proc. IEE. vol. 114, No. 3, March, 1967, pp. 327–332.

Nelson, E. B.: "Multivibrator Adapted as Frequency Standard," in Electronic Design, Feb. 17, 1964, pp. 94–95.

EDWARD E. KUBASIEWICZ, Primary Examiner

U.S. Cl. X.R.

307—118, 291; 331—113